US011372122B2

(12) United States Patent
Chen et al.

(10) Patent No.: US 11,372,122 B2
(45) Date of Patent: Jun. 28, 2022

(54) HIGH-RESOLUTION PROCESSING METHOD FOR SEISMIC DATA BASED ON INVERSE MULTI-RESOLUTION SINGULAR VALUE DECOMPOSITION

(71) Applicant: Chengdu University of Technology, Chengdu (CN)

(72) Inventors: Hui Chen, Chengdu (CN); Lingqi Lu, Chengdu (CN); Ying Hu, Chengdu (CN); Xuping Chen, Chengdu (CN); Youhua Wei, Chengdu (CN); Ke Guo, Chengdu (CN); Hongyan Qian, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 279 days.

(21) Appl. No.: 16/746,864

(22) Filed: Jan. 18, 2020

(65) Prior Publication Data
US 2020/0233108 A1 Jul. 23, 2020

(30) Foreign Application Priority Data
Jan. 18, 2019 (CN) .......................... 201910094547.5

(51) Int. Cl.
*G01V 1/28* (2006.01)

(52) U.S. Cl.
CPC ............ *G01V 1/28* (2013.01); *G01V 2210/00* (2013.01)

(58) Field of Classification Search
None
See application file for complete search history.

(56) References Cited

U.S. PATENT DOCUMENTS

2016/0313459 A1* 10/2016 Scoullar .................. G06F 30/20

\* cited by examiner

*Primary Examiner* — Raul J Rios Russo
*Assistant Examiner* — Carl F. R. Tchatchouang
(74) *Attorney, Agent, or Firm* — Novoclaims Patent Services LLC; Mei Lin Wong (57) ABSTRACT

A high-resolution processing method for seismic data based on inverse multi-resolution singular value decomposition includes the steps of: step 1: obtaining a single-trace seismic signal X as a raw signal; step 2: decomposing the seismic signal by using MRSVD algorithm to obtain a series of detailed singular values and inversely recursing the detailed singular values layer by layer to obtain a new detailed signal and an approximate signal; and step 3: sequentially superimposing the new detailed signal on the raw signal, layer by layer, to compensate the high-frequency component of the seismic signal so as to obtain a high-resolution seismic signal.

5 Claims, 6 Drawing Sheets

HIGH-RESOLUTION PROCESSING METHOD FOR SEISMIC DATA BASED ON INVERSE MULTI-RESOLUTION SINGULAR VALUE DECOMPOSITION

BACKGROUND OF THE PRESENT INVENTION

Field of Invention

The present invention relates a field of seismic measurement and detection, and more particularly to a high-resolution processing method for seismic data based on inverse multi-resolution singular value decomposition.

Description of Related Arts

In a field of seismic exploration, improving the resolution of seismic signals is one of major factors for data acquisition and processing. Since the resolution of seismic signals as a key of characterizing the stratum details during the seismic measurement and detection, it is significant important for studying thin layer or small geological structure. Therefore, many geophysicists have proposed and developed several types of methods for high-resolution processing of seismic data: (1) Spectral whitening: it improves the signal resolution by broadening the amplitude spectrum without changing the phase spectrum of the wavelet, wherein spectral whitening is a "pure amplitude" filtering process. (2) Inverse Q filtering: it is a data processing technology that compensates for the attenuation effect of the earth absorption. It not only compensates the amplitude attenuation and frequency loss, but also improves the phase characteristics of the seismic records, so that it can improve the continuity of the seismic events, increase the weak reflected wave energy, and enhance the signal-to-noise ratio and resolution of seismic data. (3) Multi-scale conjoint analyzing method: it often uses geophysical techniques such as logging data, cross-well seismic, and VSP to reflect different underground scale properties of the same target geological body, so as to improve the resolution of seismic data through the joint functions. (4) Deconvolution: by assuming that the seismic wavelet is the minimum phase and the reflection coefficient is a Gaussian white noise distribution, the autocorrelation of seismic records is used instead of the autocorrelation of wavelets, and based on such configuration, the second-order statistics-based Wiener filtering is used to implement wavelet estimation and deconvolution.

The above mentioned methods have a good result in improving the resolution of seismic data. However, these methods have problems of difficultly maintaining the amplitude relative relationship of seismic data, highly depending on quality factor Q value, or requiring special well data, such that better compensation results can only be obtained within their respective scopes of application.

SVD (Singular Value Decomposition) is a method that uses strong correlation between seismic signals to decompose seismic data by scale and rotation transformation according to the energy distribution relationship. SVD method can decompose a signal into a series of detailed signals that reflect the signal's detailed characteristics and approximate signals that reflects the main features of the signal. Multi-resolution singular value decomposition (MRSVD) is an adaptive time-frequency analysis that combines the principle of matrix recursion and SVD method to gradually decompose signals with different scales by scale and rotation transformation. This MRSVD method has no problem of determining the number of rows and columns of the matrix, wherein the structure of the matrix is simple. However, the combination of recursive decomposition and the simple dichotomous matrix can achieve a multi-level decomposition to reflect the detailed components and approximate components with different scales in the signal, so as to extract the implied signal characteristics. Currently, it has been successfully applied in the fields of signal identification, signal recovery and denoising, and mechanical fault diagnosis.

In order to facilitate understanding, the principle of the MRSVD algorithm is described as follows.

MRSVD decomposition process: For a discrete seismic signal $X=(x_1, x_2, x_3, \ldots, x_N)$, use this signal to construct a 2-row Hankel matrix.

$$H = \begin{pmatrix} x_1, x_2, x_3, \ldots, x_{N-1} \\ x_2, x_3, \ldots, x_{N-1}, x_N \end{pmatrix} \quad (1)$$

The SVD will process this matrix to obtain:

$$H = USV^T \quad (2)$$

wherein orthogonal matrix $U=(u_1, u_2)$, $U \in R^{2 \times 2}$ orthogonal matrix $V=(v_1, v_2, \ldots, v_{(n-1)})$, $V \in R^{(N-1) \times (N-1)}$ diagonal matrix $S=(\text{diag}(\sigma_a, \sigma_d), O)$, $S \in R^{2 \times (N-1)}$, $\sigma_a \ll \sigma_d$. The equation (2) is rewritten as column vector $u_i$ and $v_i$ representing as:

$$H = \sigma_a u_1 v_1^T + \sigma_d u_2 v_2^T \quad (3)$$

wherein $u_i \in R^{2 \times 1}$, $v_i \in R^{(N-1) \times 1}$, $i=1, 2$. If $H_a = \sigma_a u_1 v_1^T$, then $H_a \in R^{2 \times (N-1)}$, wherein it corresponds to a large singular value, it is called an approximation matrix to reflect the main characteristics of the signal; $H_d = \sigma_d u_2 v_2^T$, $H_d \in R^{2 \times (N-1)}$ corresponds to small singular values, it is called the detail matrix to reflect the detailed characteristics of the signal.

The approximate signal $A_1$ and detailed signals $D_1$ acquired from the first SVD are obtained from the matrix $H_a$ and $H_d$, respectively.

Take the obtaining of the detailed signal $D_1=(d_1, d_2, \ldots, d_N)$ as an example to illustrate the obtaining process, the detail matrix $H_d$ is a two-row vector $$H_d = \begin{bmatrix} \sigma_d u_{2,1} v_2^T \\ \sigma_d u_{2,2} v_2^T \end{bmatrix} \quad (4)$$

wherein, $U_{2,1}$, $U_{2,2}$ are set as the first and second coordinates of the column vector $u_2$.

Figure 8:
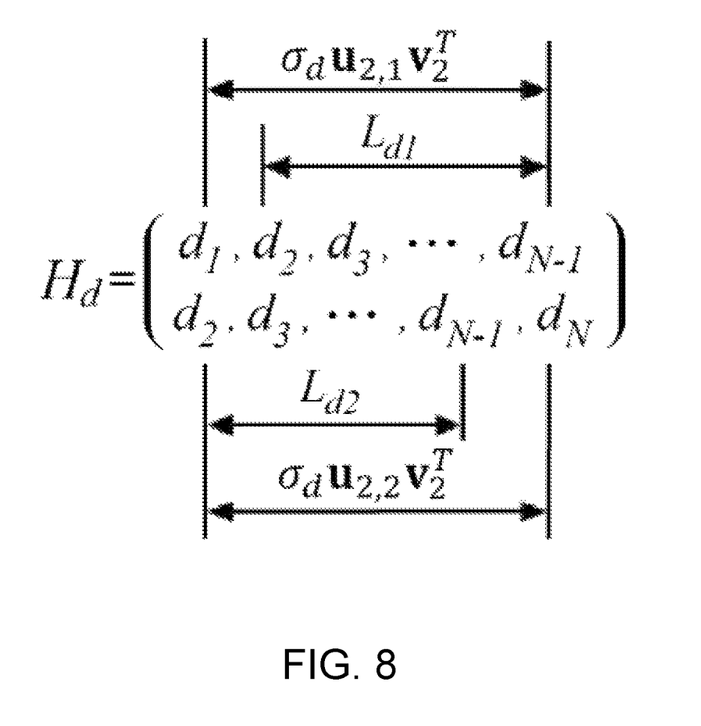
FIG. 8 is an illustration of the detail matrix $H_d$.

As shown in FIG. 8 of the drawings, let $L_{d1}$ and $L_{d2}$ be the sub-vectors of the two row vectors of the detail matrix $H_d$, and respectively represent each row vector of $d_2, d_3, \ldots, d_{n-i}$, but $L_{d1} \neq L_{d2}$.

For example, the value $d_2$ in $L_{d1}$ is $\sigma_{d1} u_{2,1} v_{2,2}$, and in $L_{d2}$ is $\sigma_{d1} u_{2,2} v_{2,1}$. These two values are obviously not equal. Therefore, in order to obtain an approximate signal with complete information, the values of $L_{d1}$ and $L_{d2}$ are averaged, and the averaged value is used as the corresponding data in the detailed signal $D_1$. Therefore, it can be finally expressed as follows:

$$D=(d_1, (L_{d1}+L_{d2})/2, d_N) \quad (6)$$

Similarly, an approximate signal $A_1$ can be obtained. Accordingly, the first decomposition results $D_1$ and $A_1$ are obtained using the MRSVD method, and the detailed signal $D_1$ corresponds to the small singular value $\sigma_{d1}$, which reflects the detailed characteristics of the signal. The approximate signal $A_1$ corresponds to a large singular value $\sigma_{a1}$ to reflect the main characteristics of the signal. Then, by using the matrix $A_1$ shown in equation (1) and perform the same processing, the two component signals $D_2$ and $A_2$ are obtained. Then, the results are decomposed layer by layer. Finally, the original signal is decomposed into a series of detailed signals and approximate signals.

Figure 1:
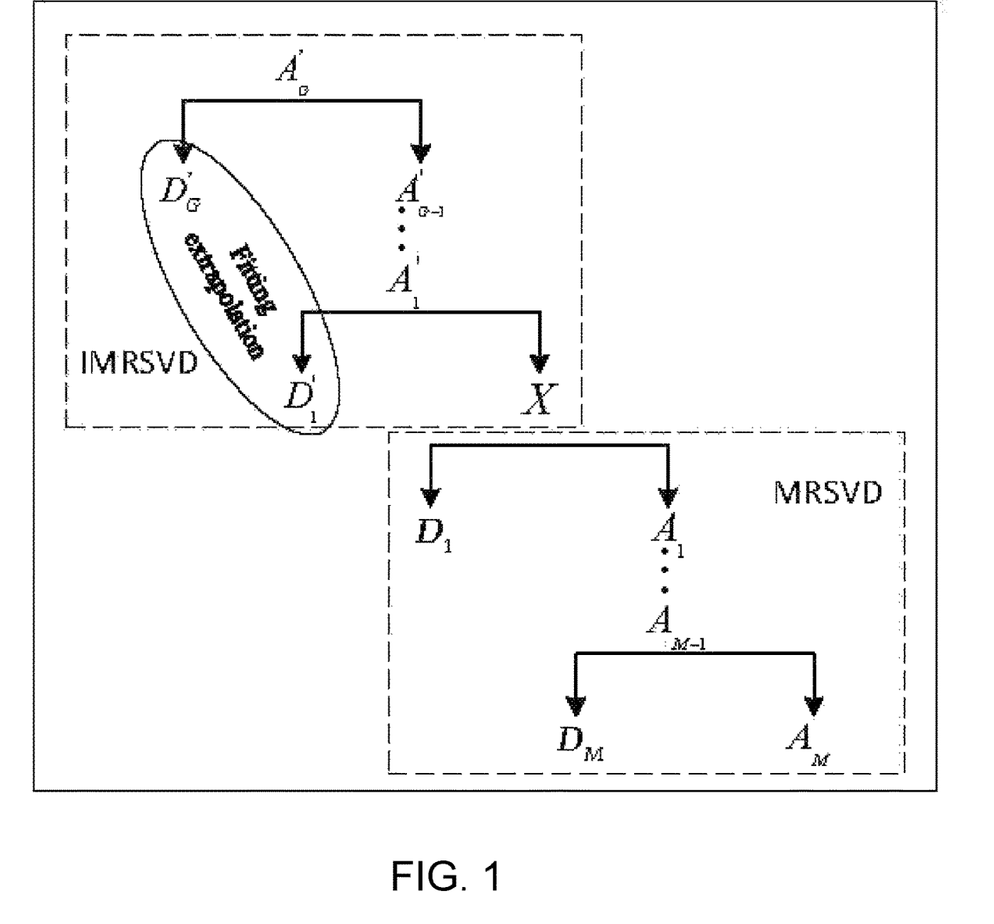
FIG. 1 is an exploded schematic diagram of IMRSVD according to a preferred embodiment of the present invention.
Figure 2:
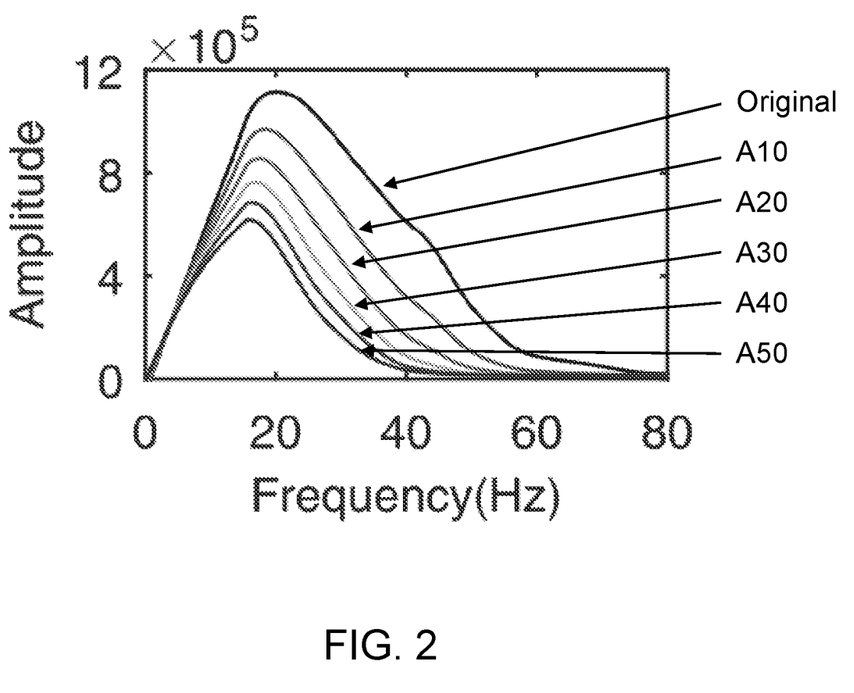
FIG. 2 is a diagram illustrating the amplitude spectrum of the approximate signal obtained during the MRSVD decomposition process according to the above preferred embodiment of the present invention, wherein the lines in FIG. 2 represent the original and 10th to 50th decompositions from top to bottom, respectively.

As shown in FIG. 2, the inventor studied that the amplitude spectrum of the approximate signal is obtained during the MRSVD decomposition process, and found that when increasing the number of decompositions, the high-frequency portion of the raw signal will be continuously decomposed in the form of detailed signals, such that MRSVD essentially decomposes the high frequency portions of the signal continuously.

Therefore, the inventor researched and found that MRSVD is a reconstruction process of summing the detailed signal and the approximate signal layer by layer. In other words, the M layer of the detailed signal $D_M$ and the approximate signal are superimposed to overlap with the layer (M–1) of the approximate signal $A_{M-1}$. Then, the approximate signal $A_{M-1}$ and the detailed signal $D_{M-1}$ are superimposed to build on the layer (M–2) of the approximate signal $A_{M-2}$. The reconstruction formula that can obtain the original signal is shown as follows:

$$X = A_M + \sum_{j=1}^{M} D_j \quad (6)$$

wherein M represents the total number of decomposition levels.

SUMMARY OF THE PRESENT INVENTION

An objective of the present invention is to provide a high-resolution processing method for seismic data based on inverse multi-resolution singular value decomposition (IM-RSD), which is able to ascertain the high-frequency portion of the detected seismic signal loss by inverse recursion so as to superimpose to the raw original signal to obtain a high-resolution seismic signal.

In order to achieve the above objective, the present invention provides:

a high-resolution processing method for seismic data based on inverse multi-resolution singular value decomposition, which comprises the steps of:

Step 1: Obtain a single-trace seismic signal X as a raw signal.

Step 2: Decompose the seismic signal by using MRSVD algorithm to obtain a detailed singular value, and inversely recurse the detailed singular value layer by layer to obtain a new detailed signal and an approximate signal.

Step 3: Sequentially superimpose the new detailed signals on the raw signal, layer by layer, to compensate the high-frequency portion of the seismic signal so as to obtain a high-resolution seismic signal by an equation as:

$$A'_i = X + \sum_{i=1}^{G} D'_i, (i = 1, 2, \ldots, G)$$

wherein X represents the raw signal, $A_i'$ represents a result of the $i^{th}$ high-frequency compensation, G represents a total number of inverse recursion, and $D_i'$ is the detailed signals.

Preferably, the number of inverse recursion is controlled by modifying a variance mode, wherein an equation of the modified variance mode is shown as:

$$V_i = \sum_{t=1}^{N}\left[1 - \exp\left(-\frac{A_i'^2(t)}{a^2}\right)\right]^2 / \left\{\sum_{t=1}^{N}\left[1 - \exp\left(-\frac{A_i'^2(t)}{a^2}\right)\right]\right\}^2$$

wherein $A_i'(t)$ represents the result of the $i^{th}$ high-frequency compensation, t is a time, N is a length of the signal, a is a constant. For each high-frequency compensated signal $A_1'$, $A_2'$, . . . , $A_{(G-1)}'$, $A_G'$ the corresponding modified variance mode is calculated as $V_1$, $V_2$, . . . , $V_{(G-1)}$, $V_G$. If $V_{(G-6)} \approx V_{(G-3)} \approx V_G$, the modified variance mode is converged and reached its maximum value. Therefore, the total number of inverse recursion G is determined and the high-resolution seismic signal $A_G'$ is finally obtained.

Preferably, in the step 2, the detail singular values $\sigma_{d1}$, $\sigma_{d2}$, are obtained by using MRSVD decomposition, wherein the detail singular values are fitted by fitting function and inversely recursed to obtain the new detailed singular value $\sigma_{di}'$ (i=1, 2, . . . . Then the corresponding detailed signal $D_i'$ is obtained through the detail singular value, wherein the fitting function is shown as follows:

$$F(j) = (j)^k \exp\left(\sum_{n=0}^{N} a_n j^n\right), k \geq 0$$

wherein j represents the number of decomposition of MRSVD, $a_n$ represents a of polynomial coefficient, k is a positive number which is normally less than 3, N is a polynomial order, wherein at the condition of least square, F(j) is approximated close to the known detailed singular value, and the value k and the polynomial coefficient are obtained.

Preferably, a series of the MRSVD forward decomposition is obtained by an equation of:

$$E_j = \Sigma |A_{j-1} - A_j|^2 / \Sigma |A_{j-1}|^2, (j=1, \ldots)$$

wherein j represents the $j^{th}$ layer of MRSVD forward decomposition. When $E_j \leq 10^{-6}$, a decomposition cycle is ended. M represents a total number of the layer of MRSVD forward decomposition. $A_{j-1}$ and $A_j$ are the approximate signals obtained from the $(j-1)^{th}$ and $j^{th}$ layer respectively.

Preferably, a detail matrix is built with the new detail singular values, which is $$H_d = \begin{bmatrix} \sigma_d u_{2,1} v_2^T \\ \sigma_d u_{2,2} v_2^T \end{bmatrix},$$

such that the corresponding detailed signals are obtained.

The advantages of the present invention are that:

Based on the characteristics of the raw signal, the high frequency portion of the seismic signal is inversely recursed by inverse multi-resolution singular value decomposition (IMRSD), wherein the algorithm is that: in order to recover the high frequency of the seismic signal loss caused by the earth filtering, a first detailed signal is obtained by inversely recursing the detailed signal through MRSVD, which is the high frequency portion of the raw signal being extrapolated for the first time. The first detailed signal is superimposed on the raw signal to obtain the result of the first high-frequency compensation, and then a second detailed signal is recursively reversed, which is the high-frequency portion of the raw signal being extrapolated for the second time. The second detailed signal is superimposed on the raw signal to obtain the result of the second high-frequency compensation. Through this configuration, the inverse recursion is successively performed to continuously compensate the high frequency portion of the seismic signal, such that the bandwidth of the seismic signal is expanded to achieve the high-resolution processing of seismic data.

DETAILED DESCRIPTION OF THE PREFERRED EMBODIMENT

In the following description, for purpose of explanation, numerous specific details are set forth in order to provide a thorough understanding of some example embodiments. It will be evident, however, to one of ordinary skill in the art that embodiments of the present invention may be practiced without these specific details.

The present invention provides an IMRSVD (Inverse Multi-Resolution Singular Value Decomposition) algorithm for restoring high resolution seismic signals based on MRSVD (Multi-Resolution Singular Value Decomposition) technology. The core of the method of the present invention is to recover the high frequency of the seismic signal loss caused by the earth filtering, wherein through the MRSVD forward decomposition, all the singular values are obtained and processed by fitting and extrapolating so as to obtain a first new detailed signal. In other words, the a high-frequency portion $D_1'$ of a raw (original) signal X is extrapolated for the first time, wherein the detailed signal $D_1'$ is superimposed on the raw signal X to obtain a result $X_1'$ of first high frequency compensation and then to recursively reverse the second detailed signal $D_2'$. In other words, the high frequency portion $D_2'$ of the raw signal X is extrapolated for the second time, wherein the detailed signal $D_2'$ is superimposed on the signal $X_1'$ to obtain a result $X_2'$ of second high frequency compensation. Therefore, through successively reverse recurrence to continuously compensate the high frequency component, seismic signal bandwidth is expanded to achieve high-resolution processing of seismic data.

Therefore, according to the present invention, the high-resolution processing method comprises the following processes:

The high-resolution processing method based on Inverse Multi-Resolution Singular Value Decomposition comprises the following steps.

Step 1: Obtain a single-trace seismic signal X as a raw signal.

Step 2: Decompose the seismic signal by using MRSVD algorithm to obtain a detailed singular value, and inversely recurse the detailed singular value layer by layer to obtain a new detailed signal and an approximate signal.

Specifically, a series of the MRSVD forward decomposition is obtained by the following equation:

$$E_j = \Sigma|A_{j-1} - A_j|^2 / \Sigma|A_{j-1}|^2, (j=1, \ldots)$$

wherein j represents the $j^{th}$ layer of MRSVD forward decomposition. When $E_j \leq 10^{-6}$, a decomposition cycle is ended. M represents a total number of the layer of MRSVD forward decomposition. $A_{j-1}$ and $A_j$ are the approximate signals obtained from the $(j-1)^{th}$ and $j^{th}$ layer respectively.

The detail singular values $\sigma_{d1}, \sigma_{d2}, \ldots$ are obtained by using MRSVD decomposition, wherein the detail singular values are fitted by fitting function and inversely recursed to obtain the new detailed singular value $\sigma_{d1}'$ (i=1, 2, . . . ). Then the corresponding detailed signal $D_i'$ is obtained through the detail singular value, wherein the fitting function is shown as follows:

$$F(j) = (j)^k \exp\left(\sum_{n=0}^{N} a_n j^n\right), k \geq 0$$

wherein j represents the number of decomposition of MRSVD, $a_n$ represents a of polynomial coefficient, k is a positive number which is normally less than 3, N is a polynomial order, wherein at the condition of least square, F(j) is approximated close to the known detailed singular value, and the value k and the polynomial coefficient are obtained.

A detail matrix is built with the new detail singular values, which is $$H_d = \begin{bmatrix} \sigma_d u_{2,1} v_2^T \\ \sigma_d u_{2,2} v_2^T \end{bmatrix},$$

such that the corresponding detailed signals are obtained.

Step 3: Sequentially superimpose the new detailed signals on the raw signal, layer by layer, to compensate the high-frequency portion of the seismic signal so as to obtain a high-resolution seismic signal by an equation as:

$$A_i' = X + \sum_{i=1}^{G} D_i', (i = 1, 2, \ldots, G)$$

wherein X represents the raw signal, $A_i'$ represents the result of the $i^{th}$ high-frequency compensation, G represents the total number of inverse recursion, and $D_i'$ is the detailed signals.

The number of inverse recursion is controlled by modifying the variance mode, wherein an equation of the modified variance mode is shown as follows:

$$V_i = \sum_{t=1}^{N}\left[1-\exp\left(-\frac{A_i'^2(t)}{a^2}\right)\right]^2 \bigg/ \left\{\sum_{t=1}^{N}\left[1-\exp\left(-\frac{A_i'^2(t)}{a^2}\right)\right]\right\}^2$$

wherein $A_i'(t)$ represents the result of the $i^{th}$ high-frequency compensation, t is the time, N is the length of the signal, a is a constant. For each high-frequency compensated signal $A_1', A_2', \ldots, A_{(G-1)}', A_G'$ the corresponding modified variance mode is calculated as $V_1, V_2, \ldots, V_{(G-1)}, V_G$. If $V_{(G-6)} \approx V_{(G-3)} \approx V_G$, the modified variance mode is converged and reached its maximum value. Therefore, the total number of inverse recursion G is determined and the high-resolution seismic signal $A_G'$ is finally obtained.

Figure 3:
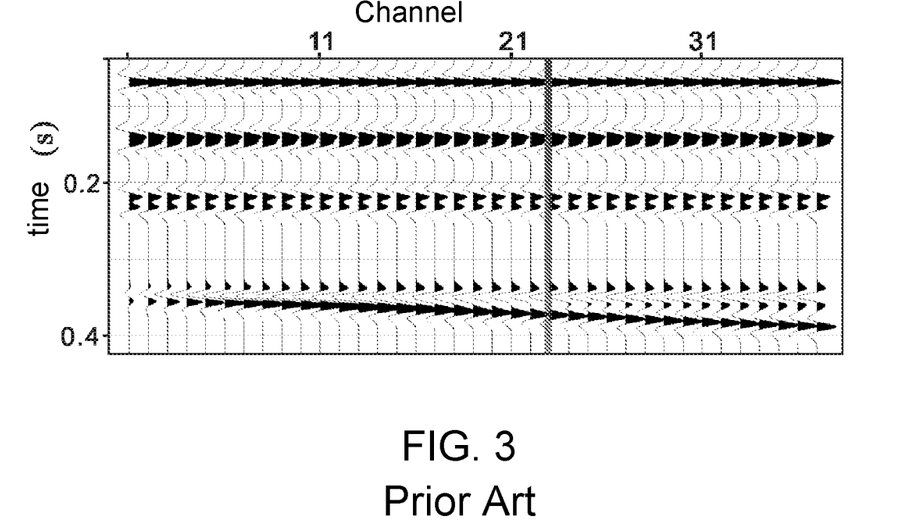
FIG. 3 is a seismic sectional view of a forward problem of a two-dimensional theoretical model.
Figure 4:
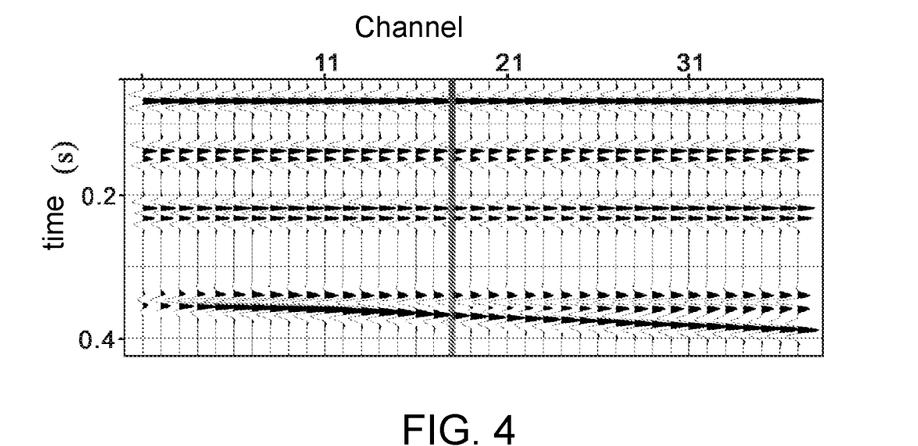
FIG. 4 is a seismic sectional view of a theoretical model after IMRSVD high-resolution processing according to the above preferred embodiment of the present invention.

According to the present invention, FIG. 3 is a conventional theoretical model and FIG. 4 is a theoretical model after IMRSVD high-resolution processing according to the present invention, wherein the FIG. 3 and the FIG. 4 are compared to show the differences therebetween. In FIG. 3, from top to bottom, the second thin layer cannot be distinguished, the third layer cannot well distinguished, and the wedge-shaped model can only be distinguished to the 23rd trace. After IMRSVD high-resolution processing as shown in FIG. 4, from top to bottom, the second layer can be distinguished in certain degree, the third layer is completely distinguishable, and the wedge-shaped model is significantly improved from being able to distinguish only the 23rd trace to being able to distinguish the 18th trace.

Figure 5:
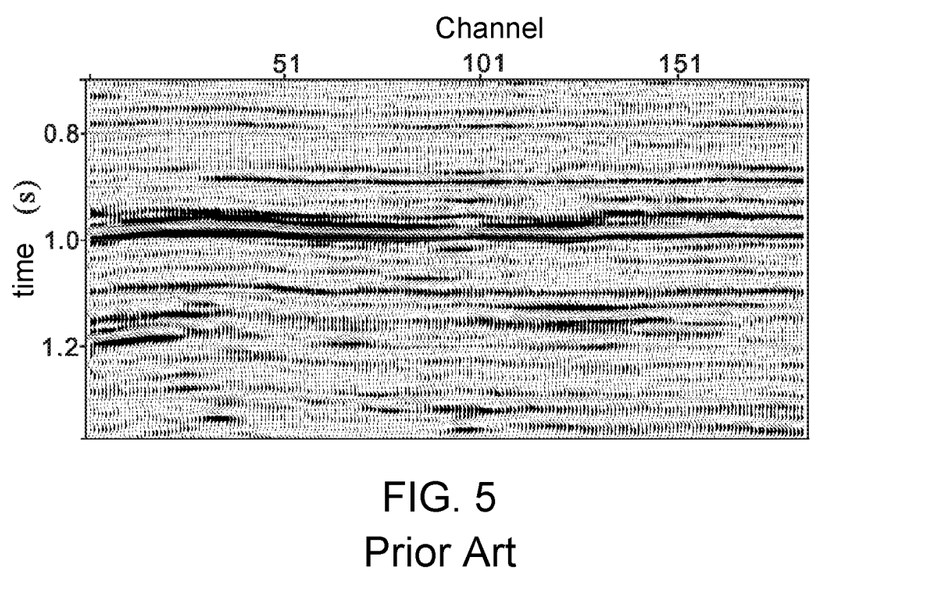
FIG. 5 is a sectional view of a two-dimensional actual seismic profile.
Figure 6:
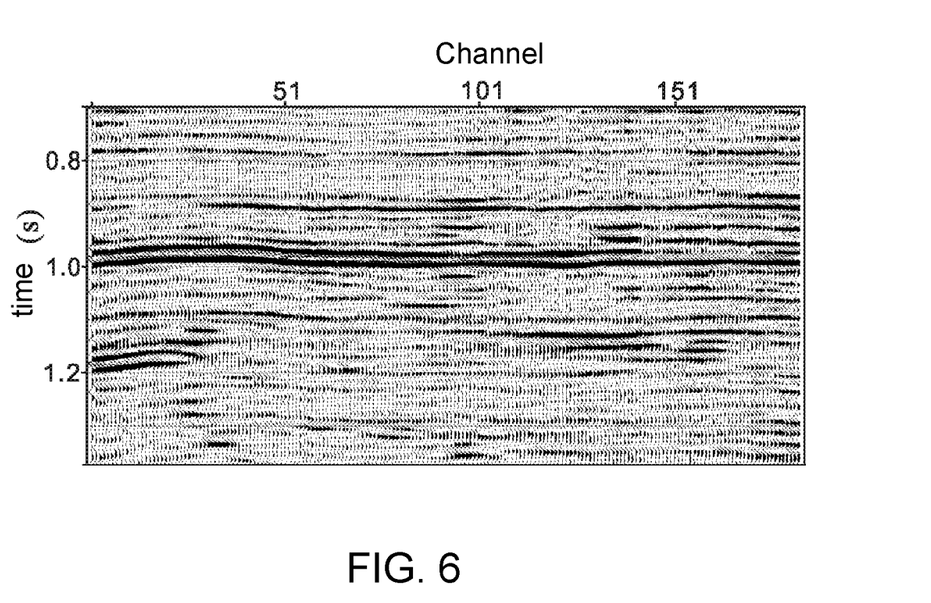
FIG. 6 is a sectional view of a two-dimensional actual seismic profile after IMRSVD high-resolution processing according to the above preferred embodiment of the present invention.
Figure 7:
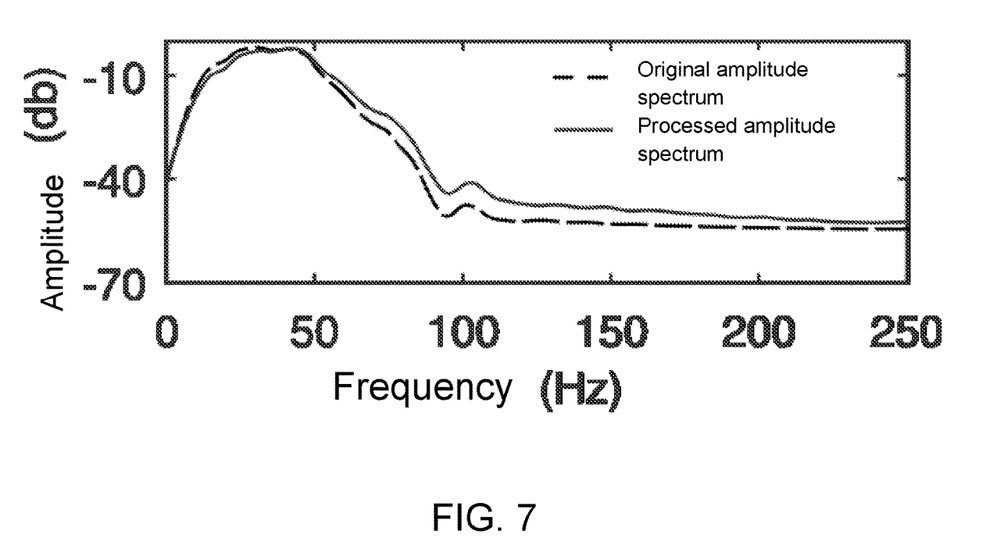
FIG. 7 is a comparison of the amplitude spectrum of the 134th trace data before and after IMRSVD high-resolution processing according to the above preferred embodiment of the present invention.

FIGS. 5 and 6 illustrate the actual seismic data before and after IMRSVD processing respectively. Comparing FIG. 5 with FIG. 6, it can be seen that after the IMRSVD processing, the seismic resolution is significantly increased, and the continuity of the seismic phase axis is enhanced, especially it is significant to show the effect of the main target layer at about 1.0 second. Accordingly, the data at 134th trace is extracted before and after IMRSVD processing for amplitude spectrum analysis. As shown in FIG. 7, it can be seen that after the IMRSVD is processed, the low frequency portion can be effectively maintained and the high frequency portion is effectively improved, to greatly improve the seismic resolution.

The above description is only the preferred embodiment of the present invention, and is not intended to be limiting. The present invention should include all modifications, equivalent substitutions and improvements made within the spirit and principles of the present invention.

What is claimed is:

1. A high-resolution processing method for seismic data based on inverse multi-resolution singular value decomposition (MRSVD), which comprises the steps of:
   step 1: obtaining a single-trace seismic signal X as a raw signal;
   step 2: decomposing the seismic signal by using MRSVD algorithm to obtain a detailed singular value, and inversely recursing the detailed singular value layer by layer to obtain a new detailed signal and an approximate signal; and
   step 3: sequentially superimposing new detailed signals on the raw signal, layer by layer, to compensate a high-frequency portion of the seismic signal so as to obtain a high-resolution seismic signal by an equation as:

$$A_i' = X + \sum_{i=1}^{G} D_i', (i=1, 2, \ldots, G)$$

wherein X represents the raw signal, $A_i'$ represents a result of $i^{th}$ high-frequency compensation, G represents a total number of inverse recursion, and $D_i'$ is detailed signals.

2. The high-resolution processing method, as recited in claim 1, wherein a number of inverse recursion is controlled by modifying a variance mode, wherein an equation of the modified variance mode is shown as:

$$V_i = \sum_{t=1}^{N}\left[1-\exp\left(-\frac{A_i'^2(t)}{a^2}\right)\right]^2 \bigg/ \left\{\sum_{t=1}^{N}\left[1-\exp\left(-\frac{A_i'^2(t)}{a^2}\right)\right]\right\}^2$$

wherein $A_i'$ (t) represents the result of the $i^{th}$ high-frequency compensation, t is a time, N is a length of the signal, a is a constant, wherein for each high-frequency compensated signal $A'_1, A'_2, \ldots, A'_{(G-1)}, A'_G$, the corresponding modified variance mode is calculated as $V_1, V_2, \ldots, V_{(G-1)}, V_G$, wherein if $V_{(G-6)} \approx V_{(G-3)} \approx V_G$, the modified variance mode is converged and reached its maximum value, wherein the total number of inverse recursion G is determined and the high-resolution seismic signal $A_G'$ is finally obtained.

3. The high-resolution processing method, as recited in claim 1, wherein, in the step 2, the detail singular values $\sigma_{d1}, \sigma_{d2}, \ldots \sigma_{dM}$ are obtained by using MRSVD decomposition, wherein the detail singular values are fitted by fitting function and inversely recursed to obtain the new detailed singular value $\sigma'_{di}$ (i=1,2, ... ), wherein the corresponding detailed signal $D_i'$ is obtained through the detail singular value, wherein the fitting function is shown as follows:

$$F(j) = (j)^k \exp\left(\sum_{n=0}^{N} a_n j^n\right), k \geq 0$$

wherein j represents a number of decomposition of MRSVD, $a_n$ represents a of polynomial coefficient, k is a positive number which is normally less than 3, N is a polynomial order, wherein at a condition of least square, F(j) is approximated close to the known detailed singular value, and the value k and the polynomial coefficient are obtained.

4. The high-resolution processing method, as recited in claim 1, wherein a series of MRSVD forward decomposition is obtained by an equation of:

$$E_j = \Sigma |A_{j-1} - A_j|^2 / \Sigma |A_{j-1}|^2, (j=1, \ldots, M)$$

wherein j represents the $j^{th}$ layer of MRSVD forward decomposition, wherein when $E_j \leq 10^{-6}$, a decomposition cycle is ended, wherein M represents a total number of the layers of MRSVD forward decomposition, $A_{j-1}$ and $A_j$ are approximate signals obtained from the $(j-1)^{th}$ and $j^{th}$ layer respectively.

5. The high-resolution processing method, as recited in claim 1, wherein a detail matrix is built with the new detail singular values, which is $$H_d = \begin{bmatrix} \sigma_d u_{2,1} v_2^T \\ \sigma_d u_{2,2} v_2^T \end{bmatrix},$$

such that the corresponding detailed signals are obtained.

* * * * *